March 23, 1971 D. W. ROPER 3,572,165
CLUTCH ACTUATOR FOR DIFFERENTIAL
Filed March 25, 1969 2 Sheets-Sheet 1

INVENTOR.
DANIEL W. ROPER
BY
Yount, Flynn & Tarolli
ATTORNEYS

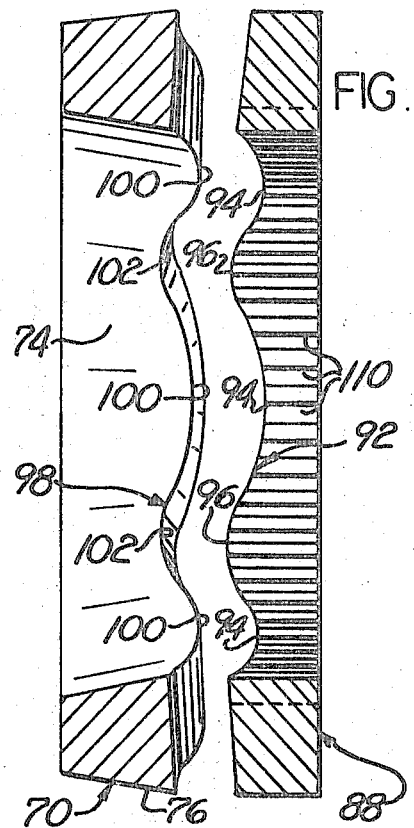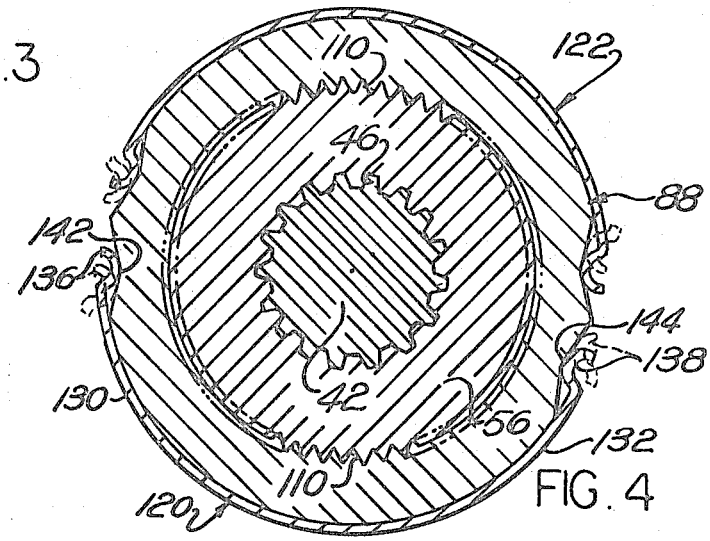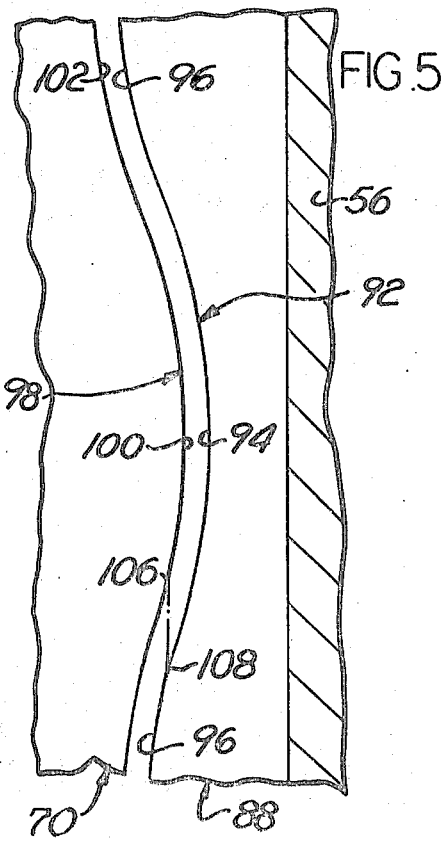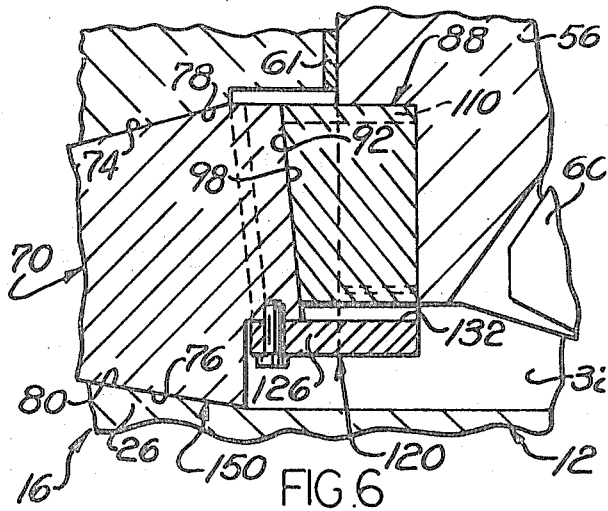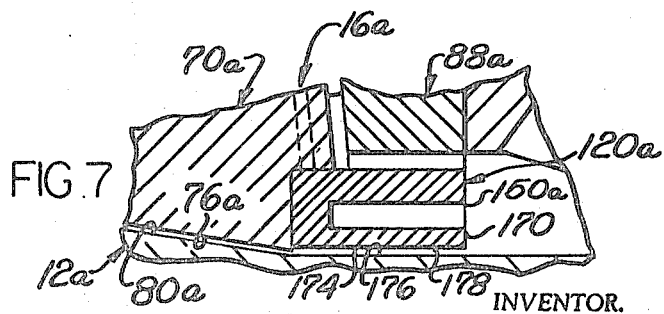
INVENTOR.
DANIEL W. ROPER
BY
Yount, Flynn & Tarolli
ATTORNEYS

United States Patent Office 3,572,165
Patented Mar. 23, 1971

3,572,165
CLUTCH ACTUATOR FOR DIFFERENTIAL
Daniel W. Roper, Rochester, Mich., assignor to Eaton
Yale & Towne Inc., Cleveland, Ohio
Filed Mar. 25, 1969, Ser. No. 810,206
Int. Cl. F16h 1/44; F16d 13/04
U.S. Cl. 74—711     3 Claims

ABSTRACT OF THE DISCLOSURE

This disclosure relates to a drive mechanism including a clutch assembly which is operated by an actuator to interconnect driving and driven members when a predetermined speed of relative rotation is present between the driving and driven members. In the operated condition, the clutch assembly retards the relative rotation between the driving and driven members. The clutch assembly includes an annular, generally wedge shaped clutch element which is mounted for rotation with one of the driving and driven members. Upon operation of the actuator, a cam element presses surfaces on the clutch element axially against complemental clutch surfaces mounted for rotation with the other of the driving and driven members to thereby retard relative rotation between the members.

---

The present invention relates generally to a drive mechanism and more particularly to a differential drive mechanism having a clutch assembly for interconnecting driving and driven members when a predetermined speed of relative rotation is present between the driving and driven members.

A known differential of the limited-slip type includes a roller clutch which is actuated to an operated condition in response to a predetermined rate of relative rotation between driving and driven members. In the operated condition, the roller clutch retards relative rotation between the driving and driven members. The clutch may be actuated to the operated condition by a suitable actuator mechanism. Roper Pat. No. 3,324,744 illustrates such a differential. Another known limited-slip differential utilizes a friction clutch of the cone type. A differential having such a cone-type clutch has been found to have certain advantages over the roller-type clutch. In known differential mechanisms utilizing a cone clutch the pressure angle relationship between the teeth of the pinion and side gears operates to press conical clutch surfaces into engagement as opposed to an actuating means which operates independently of the pressure angle of the gear teeth. Such a known differential is disclosed in Pat. No. 2,821,096.

It is an object of the present invention to provide a new and improved differential having a differential carrier member, at least one side gear member, and a clutch means for retarding relative rotation between the carrier and side gear, and wherein the clutch means includes a generally conical clutch element having a pressure relationship with one of the members to effect retardation of relative rotation between the side gear and carrier members and wherein the pressure relationship is independent of the pressure angle relationship between meshing gears of the differential.

It is another object of the present invention to provide a new and improved differential drive having relatively rotatable driving and driven members with a torque transmitting or clutch assembly therebetween which includes a generally conical clutch element associated with the driving and driven members in such a manner that there is no constant torque drag between the driving and driven members during differentiation.

Another object of this invention is to provide a new and improved drive mechanism having a clutch assembly for connecting driving and driven members wherein the clutch assembly includes a generally conical clutch element and a cam element for pressing surfaces of the clutch element axially against cooperating clutch surfaces to retard relative rotation between the driving and driven members when the clutch assembly is in an operated condition.

Still another object of this invention is to provide a new an improved drive mechanism in accordance with the preceding paragraph wherein an actuator means is provided for actuating the clutch assembly to the operated condition in response to a predetermined rate of relative rotation between the driving and driven members.

Another object of this invention is to provide a new and improved differential gear assembly having a clutch assembly which is operable between a first condition wherein a pair of members are capable of rotating relative to each other and a second condition wherein relative rotation between the members is retarded, the clutch assembly including a clutch element and means for urging clutch surfaces on the clutch element axially into engagement with cooperating clutch surfaces when the clutch assembly is in the second condition.

These and other objects and features of the invention will become more apparent upon a reading of the following description taken in connection with the accompanying drawings wherein:

FIG. 3 is a sectional view of a wedge shaped clutch element and a cam element for pressing generally conical clutch surfaces of the clutch element against cooperating clutch surfaces when the clutch assembly of FIG. 2 is in an engaged condition;

FIG. 4 is a sectional view of a biasing spring for urging the clutch assembly of FIG. 2 to the disengaged condition;

FIG. 5 is an enlarged schematic view further illustrating the relationship between the clutch element and the cam element;

FIG. 6 is a fragmentary sectional view, similar to FIG. 2, illustrating the clutch assembly in the engaged condition; and FIG. 7 is a fragmentary sectional view, similar to FIG. 2, illustrating a portion of a second embodiment of a differential mechanism constructed in accordance with the present invention.

Figure 1:
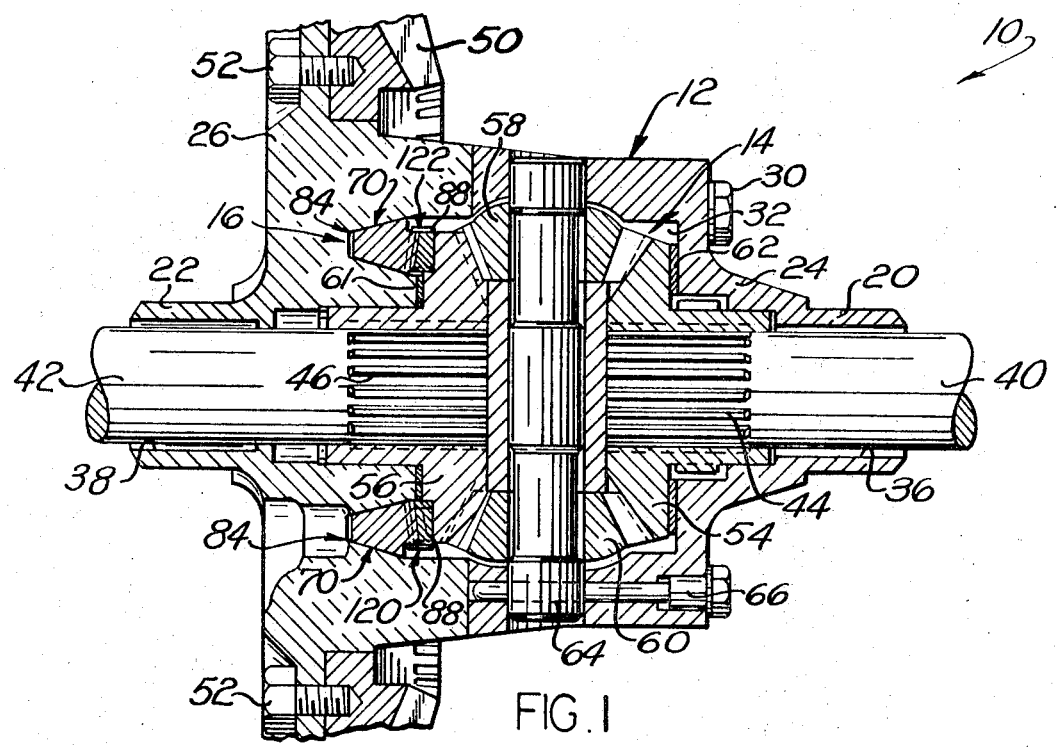
FIG. 1 is a sectional view of a differential mechanism embodying the present invention.

The present invention provides a new and improved drive mechanism which includes a clutch assembly which is operable to interconnect driving and driven members. The clutch assembly includes a clutch element mounted for rotation with one of the members and having generally conical clutch surfaces. These conical clutch surfaces are engageable with complemental clutch surfaces on the other member to retard relative rotation between the driving and driven members. An actuator assembly is provided for automatically operating the clutch assembly to the engaged condition upon the occurrence of a predetermined speed of relative rotation between the driving and driven members. While the drive mechanism is applicable to a different environment, it is particularly adapted for use in a vehicle as a differential. Accordingly, as representative of a preferred embodiment of the present invention, the drawings illustrate a differential drive mechanism or assembly 10.

The differential drive assembly 10 is especially suitable for use in driving ground or surface engaging traction wheels of a vehicle. The differential drive assembly 10 includes a rotatable planet gear carrier or casing 12, a differential gear train 14, and a clutch assembly 16. The clutch assembly 16 is operable to connect one of the gears of the gear train 14 to the planet gear carrier 12 to retard relative rotation between the gears and the carrier 12.

The planet gear carrier 12 includes a pair of support portions 20 and 22, adapted to be received in bearings of a supporting structure, such as an axle housing, not shown, by which the carrier 12 is rotatably supported. The carrier 12 further includes a pair of members 24, 26 which are integrally formed with the support portions 20, 22, respectively, and are secured together by screws 30 (only one of which is illustrated). The members 24, 26 define a gear chamber 32 in which the gear train 14 and clutch assembly 16 are located. The support portions 20, 22 are provided with axial openings 36, 38 which communicate with the chamber 32 and receive or accommodate driven or power output means as represented by axle shafts 40, 42, respectively, whose outer end portions are connected with traction wheels, or the like, not shown, and whose inner or adjacent end portions are connected with the gear train 14 by splines 44, 46 which are formed on the end of the shafts 40, 42.

The differential drive assembly 10 includes a ring gear 50 extending around and mounted on the carrier 12 by means of connecting screws 52 which extends through a flange portion of the planet carrier 12. A suitable drive pinion, not shown, meshes with the ring gear 50 and represents the power input means for the differential drive assembly or mechanism 10 and upon rotation effects rotation of the ring gear 50 to rotate the planet carrier 12.

The gear train 14 is operable to transmit the rotary motion of the planet carrier 12 to the output shafs 40, 42. The gear train 14 comprises a pair of bevel side gears 54, 56 and a group of bevel pinion planetary gears 58, 60 disposed between and meshed in engagement with the side gears 54, 56 for drivingly connecting the latter. The side gears 54 and 56 are retained against outward movement by thrust washers 61 and 62. The planetary gears 58, 60 are rotatably supported by the carrier 12 by means of a pinion shaft 64 extending across the gear chamber 32 and secured to the carrier 12 by an anchor pin 66.

The side gears 54, 56 and pinion gears 58, 60, are, in the preferred embodiment, all bevel gears of conventional form as far as the teeth thereof are concerned, and the tooth profiles are of a conventional shape having pressure angle values coming within the usual range of such values. The side gears 54, 56 are provided with splines which mesh with splines 44, 46 on the shafts 40, 42 to drivingly connect the side gears 54, 56 to the shafts 40, 42, respectively.

In accordance with a feature of the present invention, the clutch assembly 16 is operable between a disengaged condition (FIG. 2) wherein the axle shafts 40 and 42 are freely rotatable relative to each other and an engaged condition (FIG. 6) wherein the clutch assembly 16 drivingly interconnects the axle shafts 40 and 42 to retard relative rotation therebetween. When the clutch assembly 16 is in the disengaged condition of FIG. 2, generally conical clutch surfaces 74 and 76 on an annular clutch element or member 70 are axially spaced apart from complemental inwardly sloping clutch surfaces 78 and 80 formed by an annular recess 84 in the carrier 12. This axial spacing between the clutch surfaces enables the carrier 12 to be freely rotated relative to the clutch element 70 when the clutch assembly 16 is disengaged. It should be noted that the spacing between the clutch surfaces 74 and 78 and between the clutch surfaces 76 and 80 is relatively small and has been exaggerated somewhat in FIG. 2 for purposes of illustration.

Figure 2:
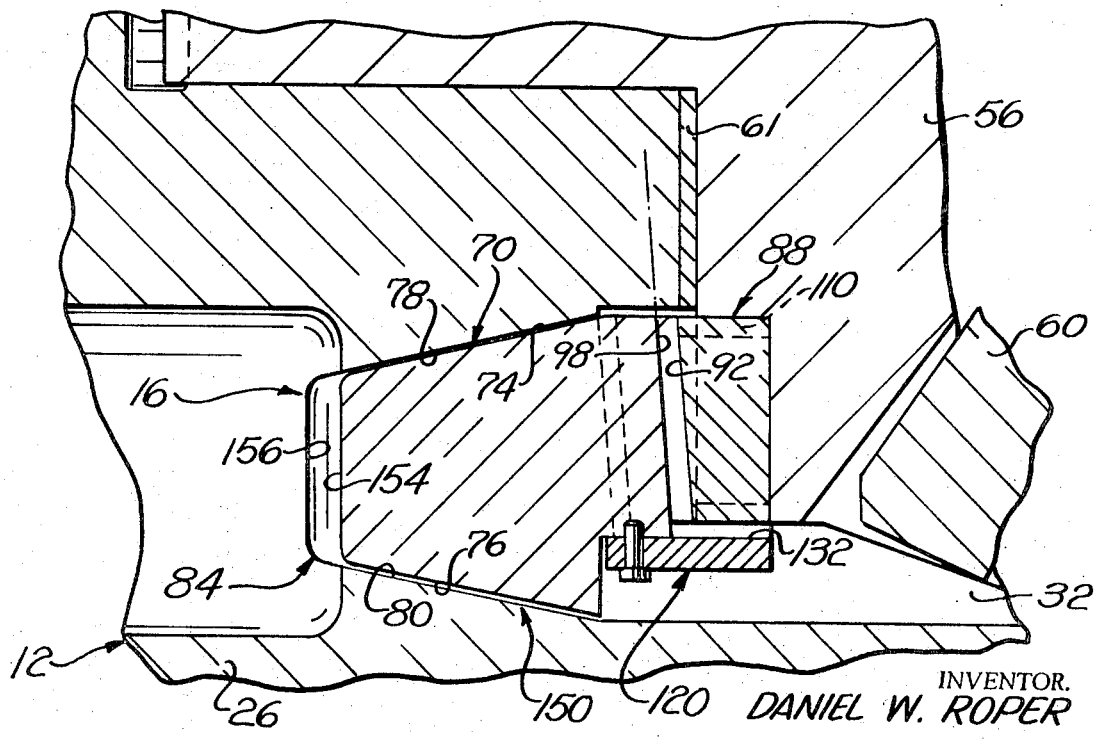
FIG. 2 is a fragmentary sectional view, on an enlarged scale, illustrating the structure of a clutch assembly of the differential mechanism of FIG. 1, the clutch assembly being shown in a disengaged condition.

When the clutch assembly 16 is engaged, the clutch surfaces 74 and 76 on the clutch element 70 are pressed axially against the clutch surfaces 78 and 80 by a cam element or member 88. This frictional engagement between the clutch surfaces 74, 76, 78 and 80 retards rotation of the carrier 12 relative to the clutch element 70. The conical clutch surfaces 74 and 76 are disposed on planes which intersect each other at an acute angle and extend at acute angles to the axes of rotation of the axle shafts 40 and 42 to provide the clutch element 70 with a generally wedge shaped cross sectional configuration (FIG. 2). This wedge shaped cross sectional configuration of the clutch element 70 tends to result in firm engagement of the clutch element with the complemental wedge shaped recess 84 to thereby tend to maximize the frictional resistance to movement between the clutch surfaces 74, 76, 78 and 80.

The cam element 88 has an undulating annular cam surface 92 (see FIG. 3) which presses the conical clutch surfaces 74 and 76 on the clutch element 70 against the conical clutch surfaces 78 and 80 on the carrier 12 when the clutch assembly 16 is in the engaged condition of FIG. 6. The cam surface 92 is formed with alternating recesses 94 and protruding portions 96. The clutch element 70 is provided with a similar annular cam surface 98 having alternating protruding portions 100 which cooperate with the recesses 94 in the cam element 88 and recesses 102 which cooperate with the protruding portions 96 of the cam element 88.

When the clutch assembly 16 is in a disengaged condition of FIG. 2, the cam surface 92 on the cam element 88 is spaced from the cam surface 98 on the clutch element 70. To actuate the clutch assembly 16 from the disengaged condition of FIG. 2 to the operated or engaged condition of FIG. 6, relative rotation is provided between the clutch element 70 and cam element 88. This relative rotation brings the outwardly protruding portions 100 of the clutch element 70 and the recesses 94 of the cam element 88 into abutting engagement. Thus, the point 106 on the clutch element 70 and the point 108 on the cam element 88 (see FIG. 5) are brought into abutting engagement by actuation of the clutch assembly from the disengaged condition to the engaged condition.

Abutting engagement of the sloping portions of the cam surface 92 on the cam element 88 against similarly sloping portions of the cam surface 98 on the clutch element 70 causes an axially directed force to be applied against the clutch element 70. This axially directed force presses the clutch surface 74, 76 on the clutch element 70 into abutting frictional engagement with the clutch surfaces 78 and 80 formed on the carrier 12. As was previously mentioned, this frictional engagement between the clutch surfaces on the cam element 70 and carrier 12 retards relative rotation between the carrier 12 and clutch element 70. This is because the cam surface 98 on the clutch element 70 is pressed against the cam surface 92 on the cam element 88. The cam element 88 is secured to the side gear 56 by splines 110 (FIG. 4). Therefore when the clutch assembly 16 is engaged, forces are transmitted between the carrier 12 and side gear 56 by the clutch element 70 and cam element 88 to retard relative rotation between the carrier and gear. It should be noted that the pressure relationship between the generally conical clutch surfaces 74, 76, 78 and 80 results from the interaction between the clutch element 70 and cam element 88 and is independent of the pressure angle between the gears of the gear train 14.

The axle shaft 40 is operatively connected by the gear train 14 to the side gear 53 and carrier 12 (FIG. 1). Of course, the side gear 53 is directly connected to the axle shaft 42. Therefore, any tendency of the axle shaft 40 to rotate relative to the axle shaft 42 when the clutch assembly 16 is engaged results in an interaction between the cam surfaces 92 and 98 (FIG. 6) to urge the clutch surfaces 74 and 76 on the clutch element 70 into firmer frictional engagement with the clutch surfaces 78 and 80 on the carrier 12. This increases the rotation retarding or holding action of the engaged clutch assembly 16 and thereby prevents relative rotation between axle shafts 40 and 42.

If for some unforseen reason the differential drive assembly 10 is subjected to very large forces tending to cause relative rotation between the axle shafts 40 and 42, the frictional force between the clutch surfaces 74 and 76 on the clutch element 70 and clutch surfaces 78 and 80 on the carrier 12 can be exceeded to enable relative rotation to occur between the axle shafts 40 and 42 without subjecting the clutch assembly 16 to permanent damage. Of course, the frictional force between the clutch surfaces 74, 76, 78 and 80 varies with variations in the size of the clutch surfaces and the material from which the clutch element 70 is made. Although the clutch element 70 can be made from many different materials, it is preferred to make the clutch element from hardened steel to provide a strong unitary structure.

A pair of biasing springs 120 and 122 (see FIGS. 2 and 4) retard relative movement between the clutch element 70 and cam element 88. Accordingly, the biasing spring 120 includes an axially extending connector or body portion 126 which is fixedly secured to the clutch element 70. A pair of arms 130 and 132 project circumferentially from the body portion 126. These arms 130 and 132 are provided with arcuate end portions 136 and 138 which engage recesses 142 and 144 (FIG. 4) in the cam element 88 to thereby mount the clutch element 70 on the cam element 88. When the clutch element is in the disengaged condition, the end portions 136 and 138 of the arms 130 and 132 engage the recesses 142 and 144 to connect the clutch element 70 to the cam element 88 for rotation therewith relative to the carrier 12.

Relative rotation occurs between the clutch element 70 and cam element 88 to actuate the clutch assembly 16 to the engaged condition. This relative rotation brings the cam surface 92 on the cam element 88 and the cam surface 98 on the clutch element 70 into abutting engagement to press the clutch surfaces 74, 76 and 78, 80, respectively, together in the manner previously explained. In addition, this relative rotation moves the end portions 136 and 138 of the spring arms 130 and 132 along the sloping sides of the recesses 142 and 144 to the positions indicated in dashed lines in FIG. 4.

The arcuate end portions 136 and 138 of the spring arms 130 and 132 remain in engagement with the recesses 142 and 144 (see the dashed line position of FIG. 4) when the clutch assembly 16 is operated to the engaged condition. The pressure relationship between the arcuate end portions 136 and 138 of the spring arms 130 and 132 and sloping sides of the recesses 142 and 144 tends to reverse the previous relative rotation between the clutch element 70 and cam element 88 to thereby bias the clutch assembly 16 toward the disengaged condition. It should be understood that the biasing spring 122 cooperates with the clutch element 70 and cam element 88 in much the same manner as does the biasing spring 120.

In the illustrated embodiment of the invention, the clutch assembly 16 is actuated from the disengaged condition to the engaged condition by an actuator 150 (see FIG. 2) upon the occurrence of a predetermined speed of relative rotation between the gear 56 and carrier 12. The illustrated actuator 150 provides a viscous coupling between the clutch surfaces 74, 76 on the clutch element 70 and the clutch surfaces 78, 80, respectively, on the carrier 12. In addition, a viscous coupling is formed between an end surface 154 of the clutch element 70 and a generally parallel end surface 156 at the bottom of the recess 84 in the carrier 12. The viscous coupling between these surfaces is effected by a suitable shear fluid which fills the gear chamber 32.

The viscosity of the shear fluid is such that when the clutch element 70 is rotated at a predetermined speed relative to the carrier 12 by rotation of the gear 56 and cam element 88, the drag forces exerted by the viscous shear fluid are sufficient to overcome the retaining effect of the biasing springs 120 and 122 (see FIG. 4). Thereupon, relative movement occurs between the clutch element 70 and the cam element 88 to actuate the clutch assembly 16 to the operated condition of FIG. 6. Once the speed of relative rotation between the gear 56 and carrier 12 has been reduced, the drag forces exerted by the viscous shear fluid are also reduced. Upon a sufficient reduction in the drag forces, the biasing springs 120 and 122 are able to reverse the previous relative rotation between the clutch element 70 and cam element 88 to actuate the clutch assembly 16 to the disengaged condition of FIG. 2. The clutch element 70 then rotates with the gear 56 relative to the carrier 12 and is moved axially outwardly for a small distance by the effect of the viscous shear fluid on the surfaces of the clutch element.

A second embodiment of the invention is illustrated in FIG. 7. Since many elements of the embodiment of the invention illustrated in FIG. 7 are similar to the elements of the differential drive assembly 10 illustrated in FIGS. 1–6, numerals similar to those used to designate the elements of FIGS. 1–6 have been used to designate similar elements in FIG. 7. However, the suffix letter a has been added to the numerals for designating the elements of FIG. 7 to avoid confusion.

An actuator assembly 150a for actuating a clutch assembly 16a from the disengaged condition of FIG. 7 to the engaged condition (not shown) includes an axially extending annular flange 170 which is connected to the clutch element 70a. The flange 170 has an annular outer surface 174 which is spaced from and extends generally parallel to a similar annular surface 176 formed on the carrier 12a. The surfaces 174 and 176 cooperates to form a viscous shear space 178 there between in which a viscous shear fluid is located. The viscous shear fluid cooperates with the surfaces 174 and 176 to provide a viscous coupling between the carrier 12 and flange 170 in much the same manner as previously explained in conjunction with the surfaces of the clutch element 70 of the embodiment of FIGS. 1–6. Of course, a viscous coupling is also formed between the clutch surfaces of the clutch element 70a and the clutch surfaces of the carrier 12a in the manner previously explained in conjunction with the embodiment of FIGS. 1–6. The viscous coupling between the surfaces 174 and 176 augments the viscous coupling between the clutch element and the carrier to thereby provide a larger viscous drag on the clutch element 70a than would be formed by only the viscous coupling between the clutch surfaces of the clutch element 70a and the clutch surfaces of the carrier 12a.

In view of the foregoing description, it can be seen that the clutch assembly 16 is operable from a disengaged condition in which the carrier 12 and side gear 56 are freely rotatable relative to each other to an engaged condition in which the clutch assembly 16 drivingly interconnects the carrier and gear to retard relative rotation therebetween. Upon the occurrence of a predetermined speed of relative rotation between the gear 56 and carrier 12, the actuator 150 rotates the clutch element 70 relative to the cam element 88 to operate the clutch assembly 16 to the engaged condition. In the engaged condition, the cam surface 92 on the cam element 88 engages the cam surface 98 on the clutch element 70 to prevent further relative rotation between the clutch and cam elements and to press the clutch element axially into the recess 84 formed in the carrier 12. The axial pressure against the clutch element 70 forces the conical clutch surfaces 74 and 76 into abutting frictional engagement with the conical clutch surfaces 78, 80 of the carrier. This frictional engagement interconnects the gear 56 and carrier 12 through the clutch and cam elements 70 and 88 to retard relative rotation between the gear and carrier. It should be noted that the axial pressure exerted by the cam element 88 against the clutch element 70 is dependent upon the magnitude of the forces tending to cause relative rotation between the gear 56 and the carrier 12 and is independent of the pressure angle of the teeth of the side gear 56.

The actuator 150 operates the clutch assembly 16 from the disengaged condition to the engaged condition in response to a predetermined rate of relative rotation between the gear 56 and the carrier 12. In the present embodiment of the invention, the actuator 150 includes a viscous coupling which operatively interconnects the clutch element 70 and the carrier 12 when the clutch assembly 16 is disengaged. However, it is contemplated that the clutch assembly 16 could, if desired, be actuated from the disengaged condition to the engaged condition by a different type of actuator.

Having described my invention, I hereby claim the following:

1. A drive mechanism comprising driving and driven members, clutch means operable between a first condition permitting relative rotation between said members and a second condition wherein relative rotation between said members is prevented, said clutch means including an annular wedge-shaped clutch element mounted for rotation with said driving member, said clutch element having clutch surfaces disposed at acute angles to the axis of rotation of said driving member and frictionally engageable with similarly disposed clutch surfaces defined by said driven member, said driving member clutch surfaces being normally biased to a predetermined spaced non-engaging relationship from said driven member clutch surfaces when said clutch means is in said first condition and movable into frictional engagement therewith when said clutch means is in said second condition, means normally biasing said clutch element to a spaced position from said driven member clutch surfaces permitting relative rotation therebetween below a predetermined velocity, and actuator means including a viscous fluid coupling defined by said clutch element and said driven member for overcoming said normal biasing means and for moving said clutch element from said first condition to said second condition in response to a predetermined rate of relative rotation between said driving and driven members.

2. A differential gear assembly comprising a carrier, differential gearing mounted on said carrier, said differential gearing including a pair of side gears and pinion gears meshing therewith, clutch means operably associated with one of said side gears to prevent relative rotation between said side gear and said carrier, said clutch means including an annular, wedge-shaped clutch element having clutch surfaces disposed at acute angles to the axis of rotation of said side gear and being movable into engagement with similarly disposed clutch surfaces defined by said carrier, said clutch means further including means normally biasing said clutch element to a position spaced from said clutch surfaces defined by said carrier, cam means between said side gear and said clutch element for moving said clutch element into frictional engagement with said clutch surfaces defined by said carrier upon relative rotational movement therebetween and viscous drive means defined by said clutch element and said carrier for initiating camming of said clutch element into engagement with said carrier.

3. A drive mechanism as defined in claim 1 wherein said actuator means comprises:
said clutch element defining an axially extending cam surface facing said driving member; and
said driving member defining an axially extending cam surface facing and engageable with said clutch element, whereby relative rotation between said clutch element and said driving member initiated by said viscous coupling will cause said clutch element to be moved into frictional engagement with said drive member.

References Cited
UNITED STATES PATENTS

| | | | |
|---|---|---|---|
| 2,086,954 | 7/1937 | Fawick | 192—54X |
| 2,143,710 | 1/1939 | Murray | 192—54X |
| 2,424,942 | 7/1947 | Mynssen | 74—711 |
| 2,431,272 | 11/1947 | Mynssen et al. | 74—711 |
| 2,624,216 | 1/1953 | Nielsen | 74—711 |
| 2,768,538 | 10/1956 | Simonds | 74—710.5 |
| 2,861,665 | 11/1958 | Passler | 192—54X |
| 3,384,212 | 5/1968 | Hill | 192—54 |
| 3,392,601 | 7/1968 | Roper | 74—711 |
| 3,430,519 | 3/1969 | Roper | 192—35X |
| 3,438,282 | 4/1969 | Thornton | 74—711 |
| 3,453,905 | 7/1969 | Schmid | 192—54X |

CARLTON R. CROYLE, Primary Examiner

T. C. PERRY, Assistant Examiner

U.S. Cl. X.R.

192—35, 66, 93